US012575579B2

(12) United States Patent
Chappell

(10) Patent No.: US 12,575,579 B2
(45) Date of Patent: Mar. 17, 2026

(54) SCRIBE SAW MOUNT FOR LOIN PULLER MACHINE

(71) Applicant: Hall Fabrication, Inc., Henderson, NV (US)

(72) Inventor: David Chappell, Las Vegas, NV (US)

(73) Assignee: Hall Fabrication, Inc., Henderson, NV (US)

( * ) Notice: Subject to any disclaimer, the term of this patent is extended or adjusted under 35 U.S.C. 154(b) by 0 days.

(21) Appl. No.: 18/782,604

(22) Filed: Jul. 24, 2024

(65) Prior Publication Data

US 2026/0026518 A1 Jan. 29, 2026

(51) Int. Cl.
*A22C 17/00* (2006.01)

(52) U.S. Cl.
CPC ...... *A22C 17/0033* (2013.01); *A22C 17/0093* (2013.01)

(58) Field of Classification Search
CPC ........................ A22C 17/0033; A22C 17/0093

USPC .......................................................... 452/171
See application file for complete search history.

(56) References Cited

U.S. PATENT DOCUMENTS

| | | | | |
|---|---|---|---|---|
| 5,234,371 | A | 8/1993 | Andre et al. | |
| 5,295,898 | A | 3/1994 | Andre et al. | |
| 5,407,384 | A | 4/1995 | Boody et al. | |
| 5,882,252 | A | 3/1999 | Boody et al. | |
| 9,247,755 | B1 * | 2/2016 | Andre .................. | A22B 5/0029 |
| 2002/0019208 | A1 * | 2/2002 | Boody ............... | A22C 17/0046 452/171 |
| 2006/0035576 | A1 * | 2/2006 | Bruce .................. | A22B 5/0035 452/171 |

* cited by examiner

*Primary Examiner* — Richard T Price, Jr.
(74) *Attorney, Agent, or Firm* — McKee, Voorhees & Sease, PLC

(57) ABSTRACT

A loin puller machine is provided with a scribe saw assembly that longitudinally aligns the scribe saw blade with the actuator for raising and lowering the blade. By positioning the blade directly in front of the actuator, the actuator forces are centrally aligned with the blade so as to reduce binding and bearing wear. The alignment of the blade minimizes maintenance and increases productivity and profitability.

13 Claims, 14 Drawing Sheets

SCRIBE SAW MOUNT FOR LOIN PULLER MACHINE

TECHNICAL FIELD

This invention relates to the meat processing industry, and particularly to a scribe saw assembly of a loin puller machine used to cut the loin from the pork carcass.

BACKGROUND

In the pork processing industry, the carcass is initially cut into six portions, including the left and right sides of the front and hind quarters, and the left and the right middle portions, which include the line adjacent the backbone between the ribs and the outer layer of back fat. The middle portion is further processed on a loin puller machine, which separates the loin from the middle carcass portion. A conventional loin puller machine is shown and described in U.S. Pat. No. 5,882,252.

The loin puller machine includes a scribe saw and one or more primary cutting blades, which can process approximately 1300 carcass portions, or more, per hour. Cutting accuracy is critical for maximum yield, and thus profitability. For example, if the scribes saw cuts too deeply, beyond the bone, then the primary blade cuts too far into the carcass belly, causing yield loss. If the scribes saw cuts too shallow, the primary blade does not cut clear through the bone, which may leave bone chips in the meat. The scribe saw blade, which rotates at speeds of roughly 2000 RPM, is subjected to significant wear and failure due to the loads on the driveshaft of the blade. Excessive wear from the driveshaft sideload deflects the shaft and the blade, which may rub on the standard or mounting structure, causing breakage of the blade, which is a significant safety hazard.

Applicant's U.S. Pat. Nos. 10,405,558, 10,524,483, and 10,555,538 resolve some of the problems present in conventional loin puller scribe saw assemblies. However, some problems still exist, and replacing failed scribe saw assemblies is time consuming, and leads to downtime, which cuts into profits for the meat processing operator.

Therefore, a primary objective of the present invention is the provision of an improved loin puller scribe saw assembly which minimizes or eliminates failure of the scribe saw.

Another objective of the present invention is a provision of an approved scribe saw assembly for a loin puller machine which reduces loads on the structure, and thus reduces binding and bearing wear of the scribe saw assembly.

A further objective of the present invention is the provision of an improved scribe saw assembly for a loin puller machine which significantly reduces downtime for replacement of a failed blade.

Still another objective of the present invention is the provision of a scribe saw assembly for a loin puller machine which increases the life expectancy of the scribe saw blade and related components.

Yet a further objective of the present invention is a provision of a scribe saw mount which aligns the applied forces with the structural elements, so as to minimize risk of damage to the scribe saw blade or driveshaft.

A further objective of the present invention is the provision of a scribe saw mount for a loin puller machine which is economical to manufacture, and is simple, safe, and durable in use.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

SUMMARY

A loin puller machine is provided with an improved scribe saw assembly which minimizes binding, bearing wear, and maintenance for the scribe saw. The puller machine includes a frame with a conveyor for carrying the loin through a series of blades. The scribe saw assembly includes a bracket mounted to the frame. The scribe saw assembly also includes a circular blade with a motor for rotating the blade to cut through the loin ribs. An actuator cylinder with an extendable and retractable arm moves the blade between the raised and lowered positions. Guideposts or tracks are provided to control the up-and-down movement of the blade. The guideposts or tracks are located on opposite longitudinal sides of the actuator cylinder, with the blade longitudinally centered or aligned with the cylinder arm, such that the applied forces are aligned. The scribe saw mounting bracket is attached to the frame of the loin puller machine using a minimum of bolts, so as to minimize the time needed to detach the scribe saw assembly from the machine when maintenance is necessary.

DETAILED DESCRIPTION

Figure 1:
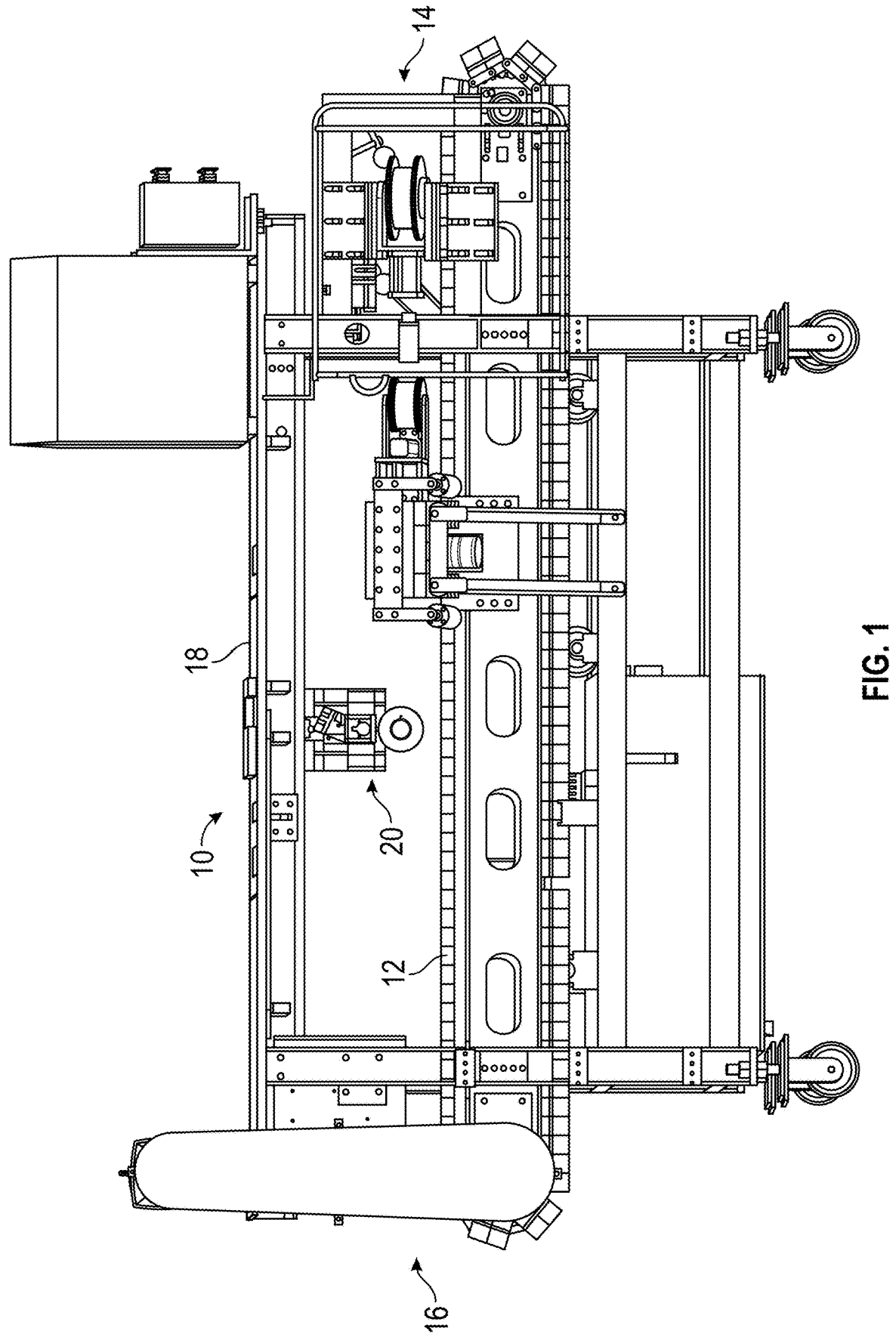
FIG. 1 is a right side elevation view of the loin puller machine having the scribe saw assembly of the present invention.
Figure 2:
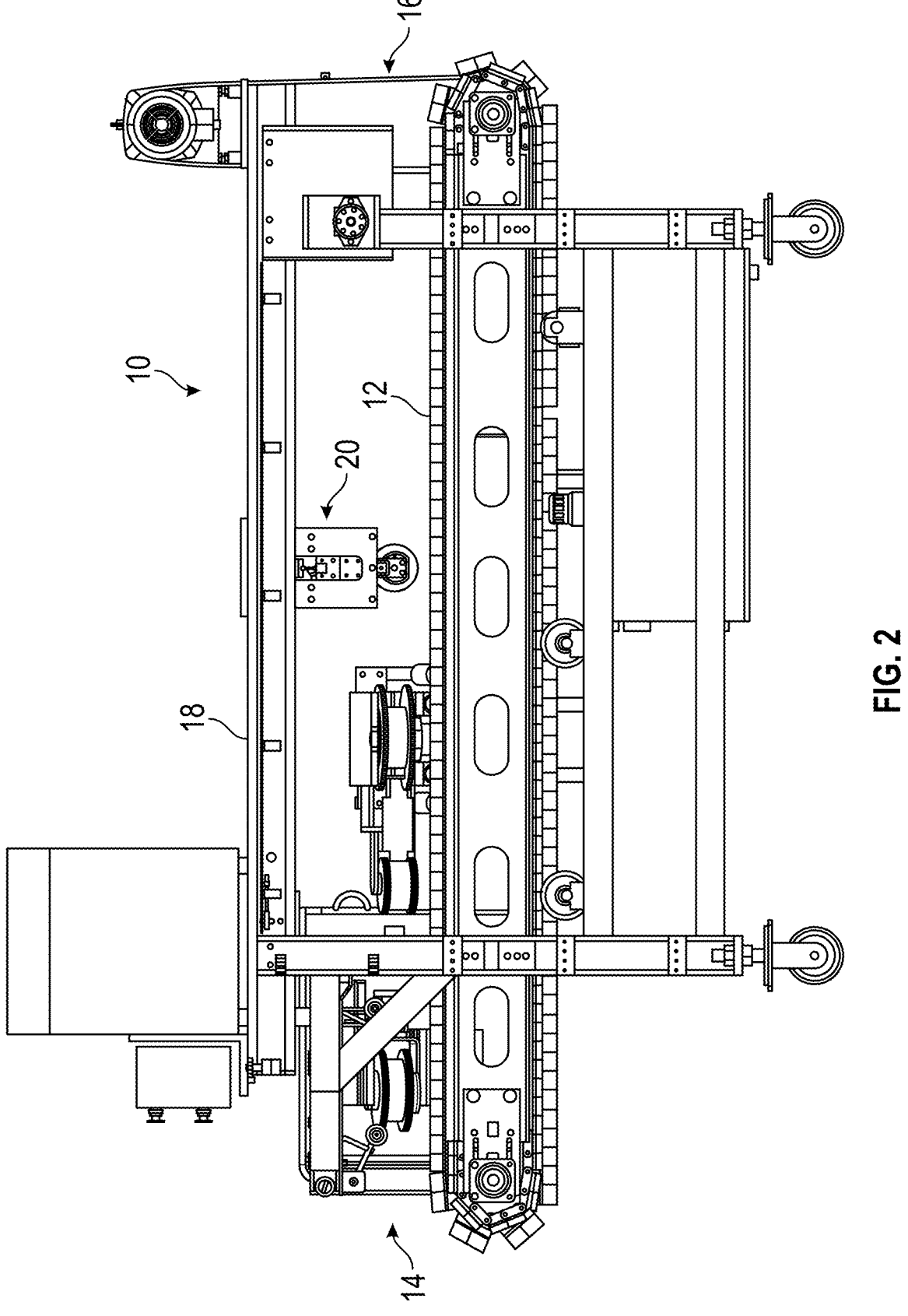
FIG. 2 is a left side elevation view of the loin puller machine shown in FIG. 1.
Figure 3:
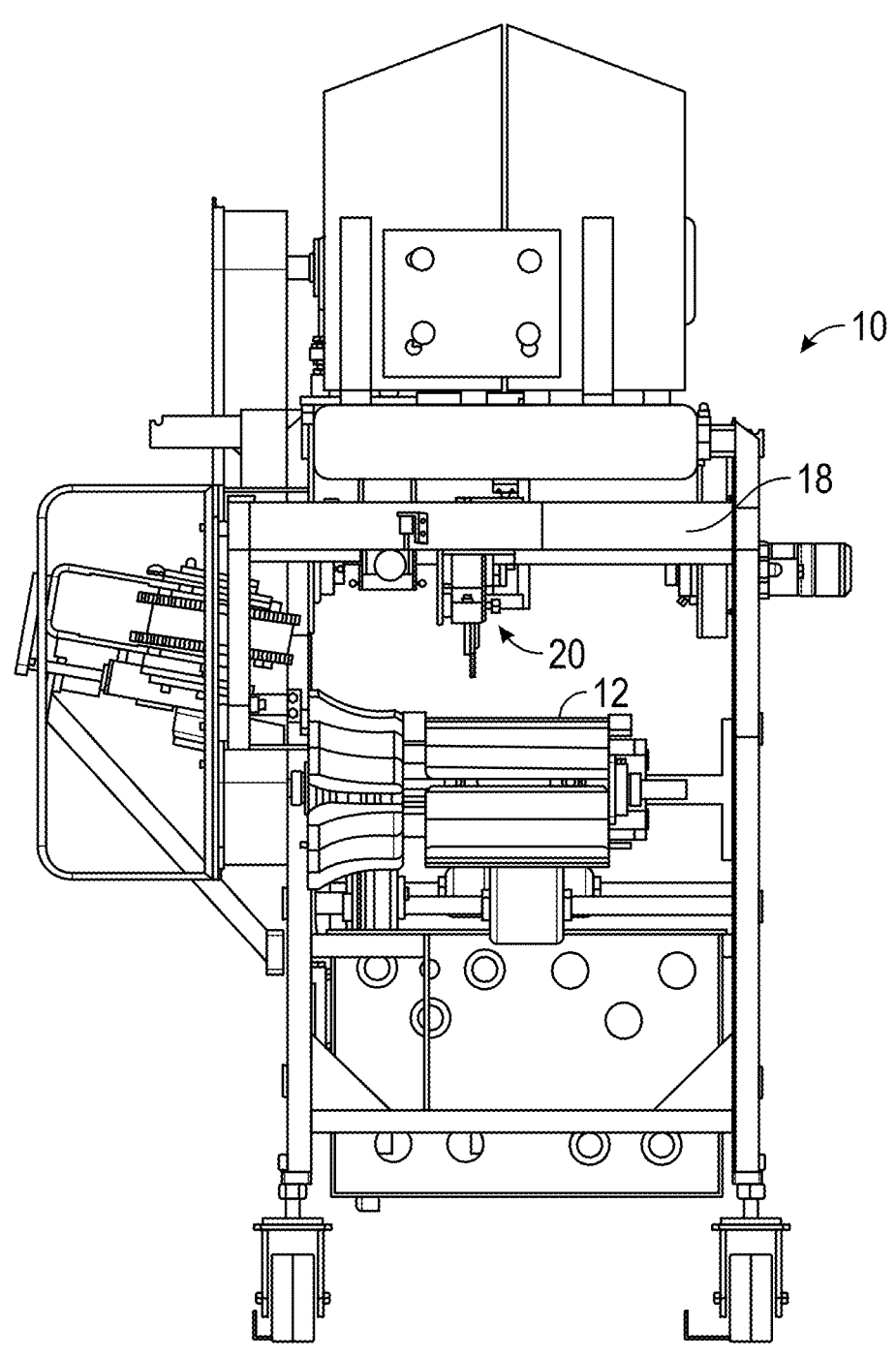
FIG. 3 is a right side view of the loin puller machine shown in FIG. 1.
Figure 4:
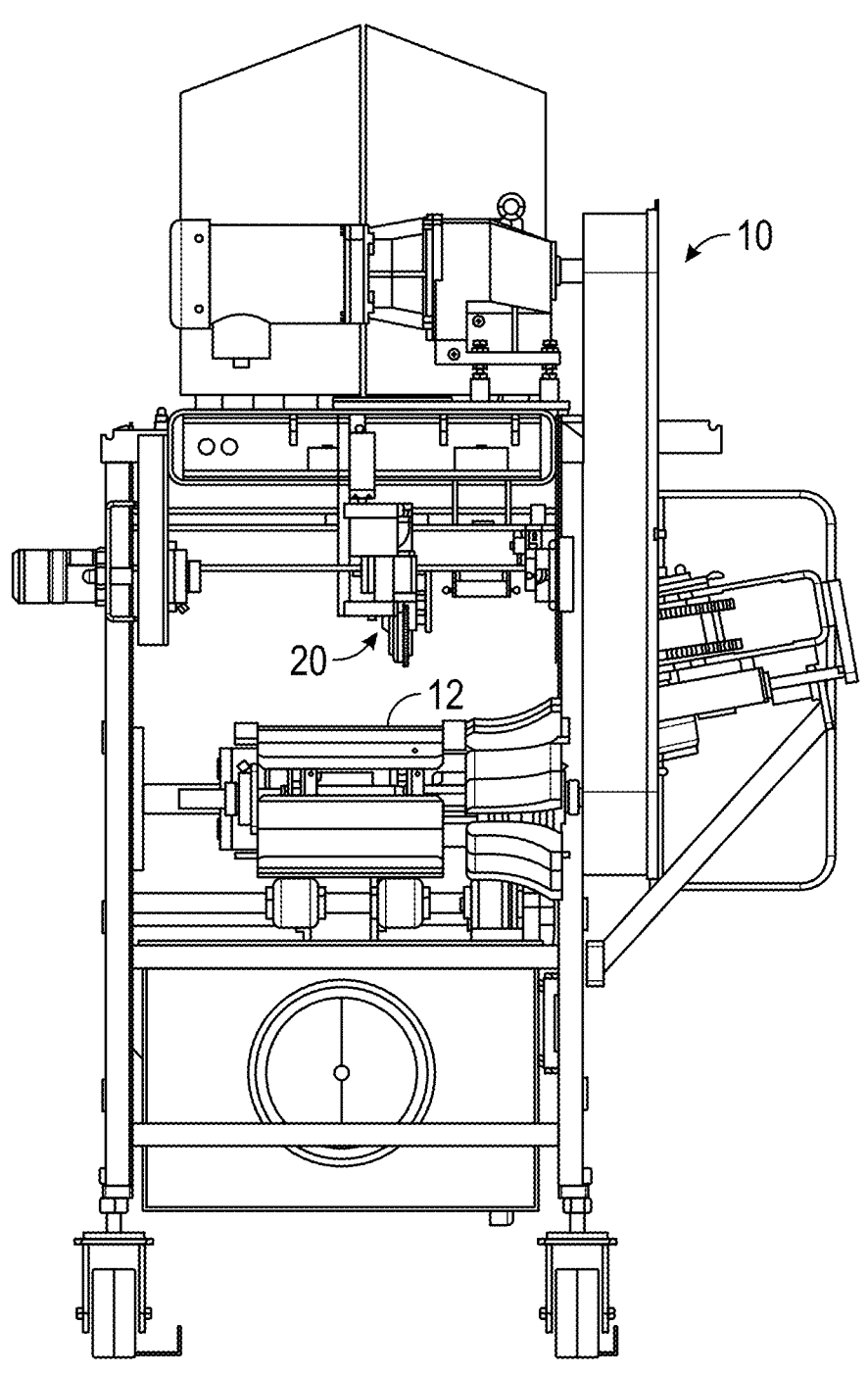
FIG. 4 is a left side view of the loin puller machine.
Figure 5:
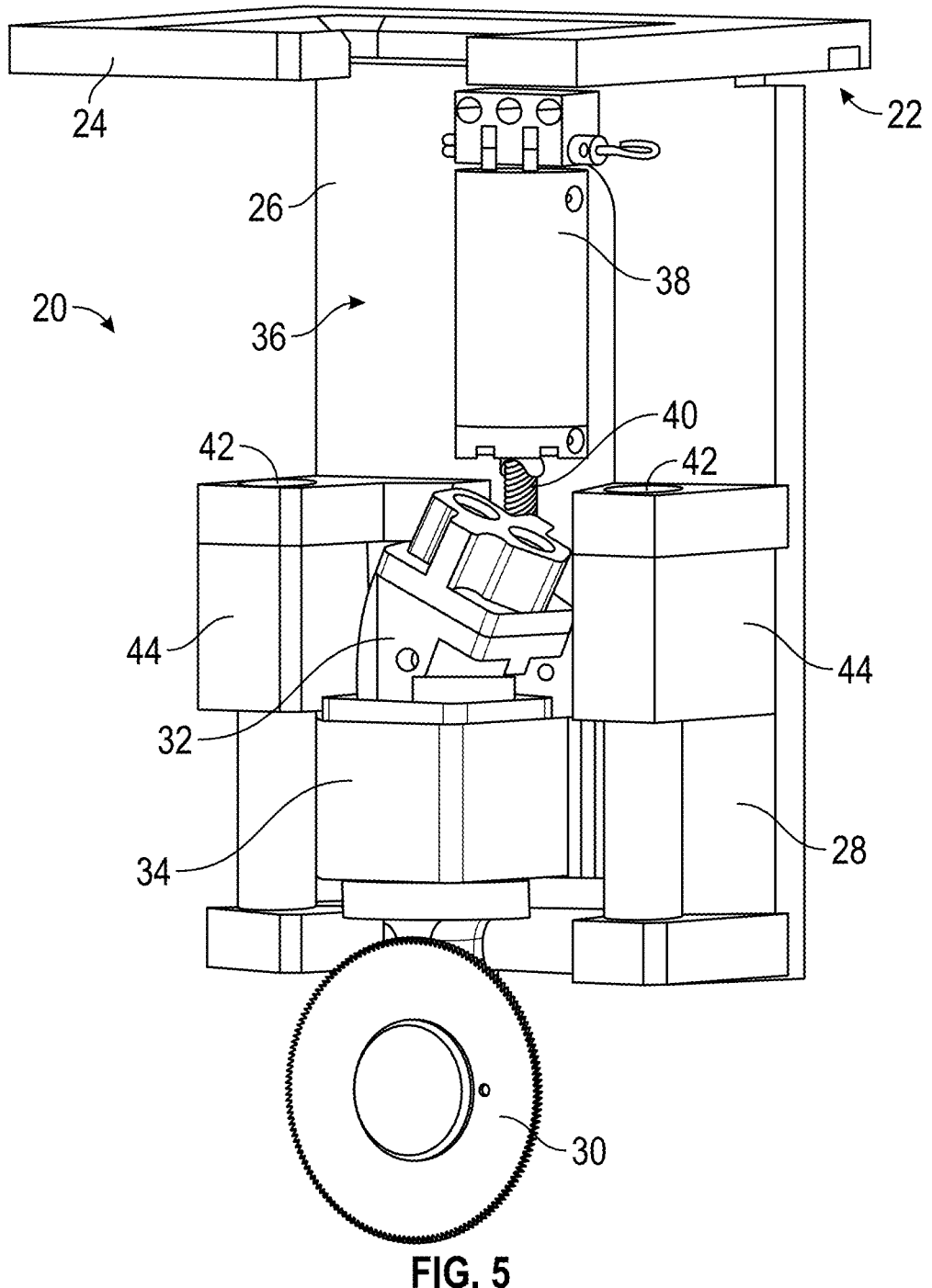
FIG. 5 is an enlarged perspective view of the scribe saw assembly in a raised position, according to the present invention.

The In FIGS. 1-4, a loin puller machine is generally designated by the reference 10. The machine 10 includes a conveyor 12 with an inlet end 14 and an outlet end 16, which define a longitudinal axis of the conveyor. The conveyor receives loin carcasses at the inlet, and carries the carcasses passed a series of blades, including a J blade, a Z blade, and a hoop blade, each of which cut specific portions of the carcass, as described in Applicant's co-pending application Ser. No. 18/416,535 entitled Sweep Edge Blades for Loin Puller Machine. For clarity, these blades have not been shown in FIGS. 1-4. Preferably, the conveyor 12 is in the form of the conveyor disclosed in Applicant's co-pending application Ser. No. 18/416,090 entitled Loin Puller Conveyor, though it is understood that other types of conveyors may be used on the loin puller machine 10.

The invention is directed toward a scribes saw assembly 20 of the loin puller machine 10. The assembly 20 includes a mounting bracket 22 with an upper plate 24 and a back plate 26. The upper plate 24 is bolted or otherwise secured to the frame 18 of the machine 10. The scribe saw assembly 20 further includes a slidable support structure 28, to which is mounted a circular blade 30, a motor 32 for rotating the blade 30, and the gearbox 34 having internal gears. The motor 32 can be a variety of known motors, such as a pneumatically driven motor, an electric motor, and the like.

Figure 6:
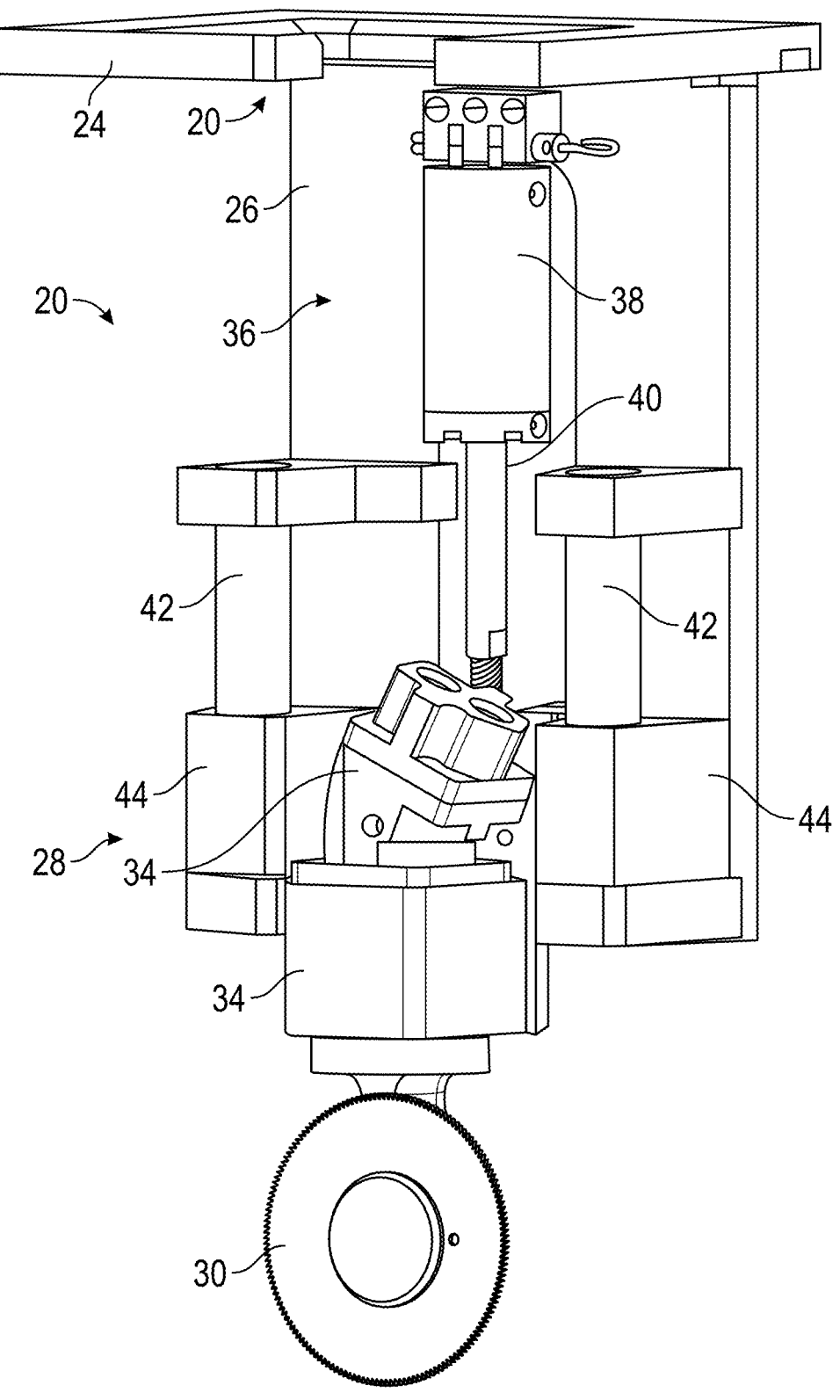
FIG. 6 is a perspective view of the scribe saw assembly in a lowered position.
Figure 7:
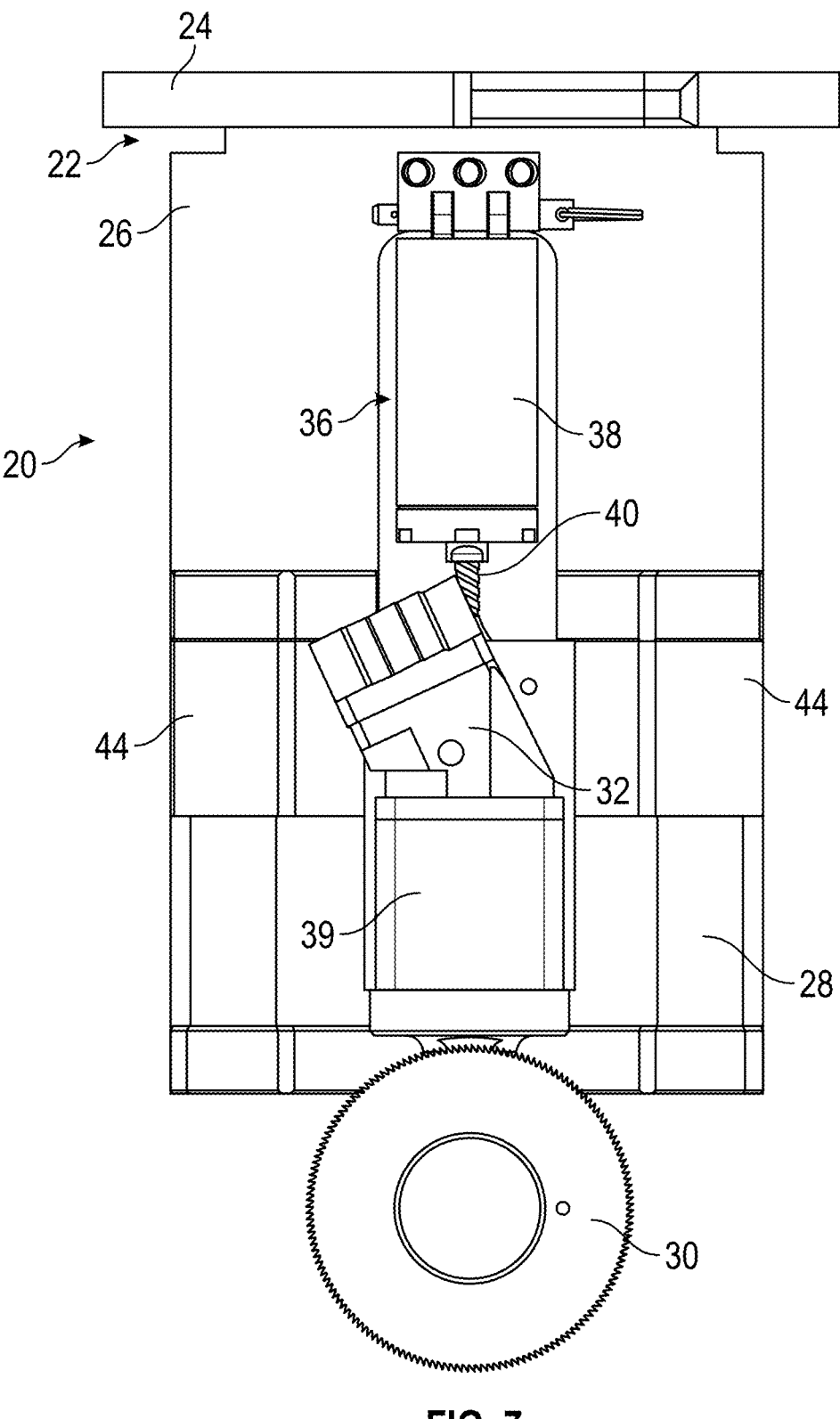
FIG. 7 is a front elevation view of the scribe saw assembly shown in FIG. 5.
Figure 8:
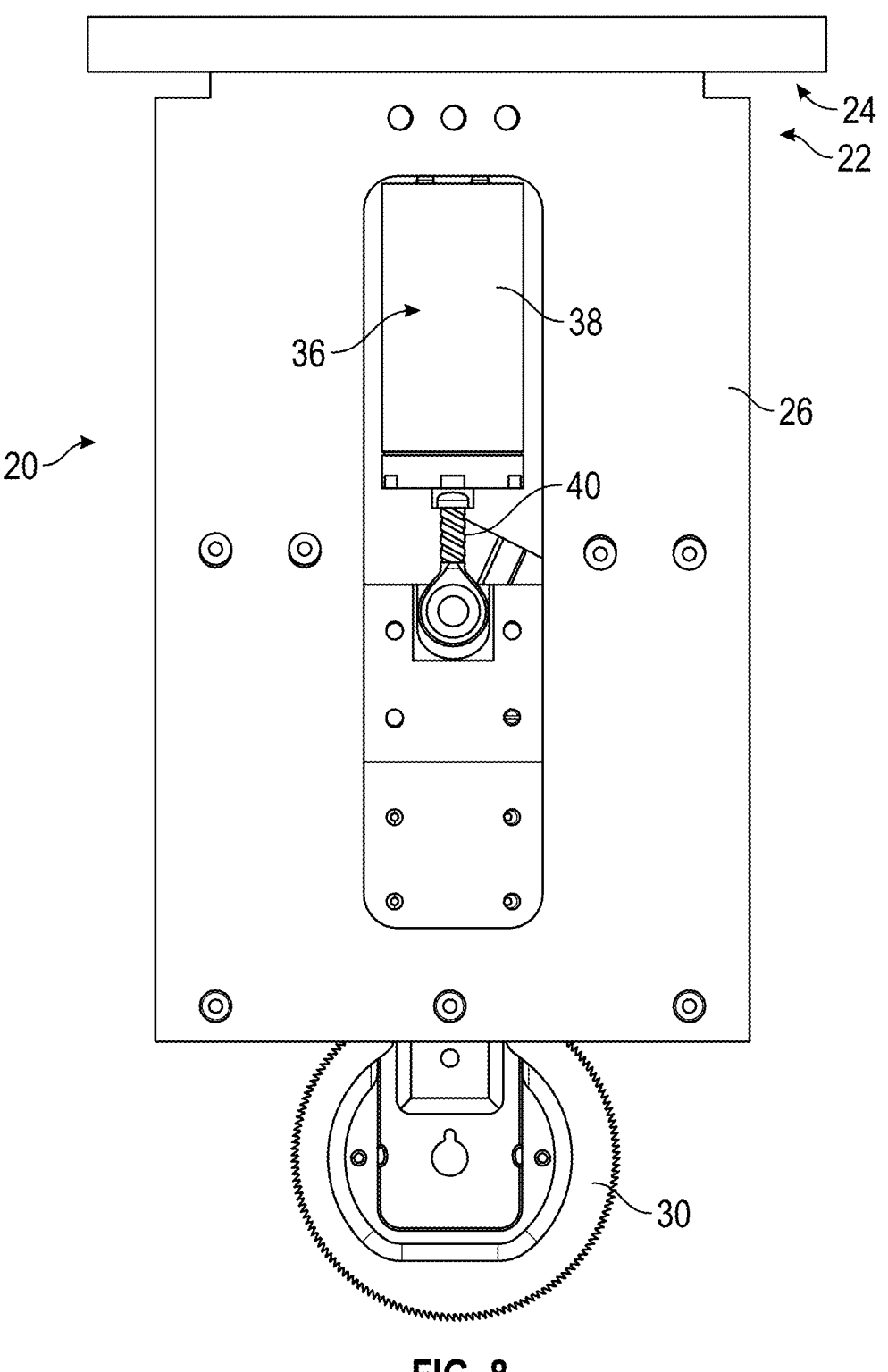
FIG. 8 is a rear elevation view of the scribe saw assembly shown in FIG. 5.
Figure 9:
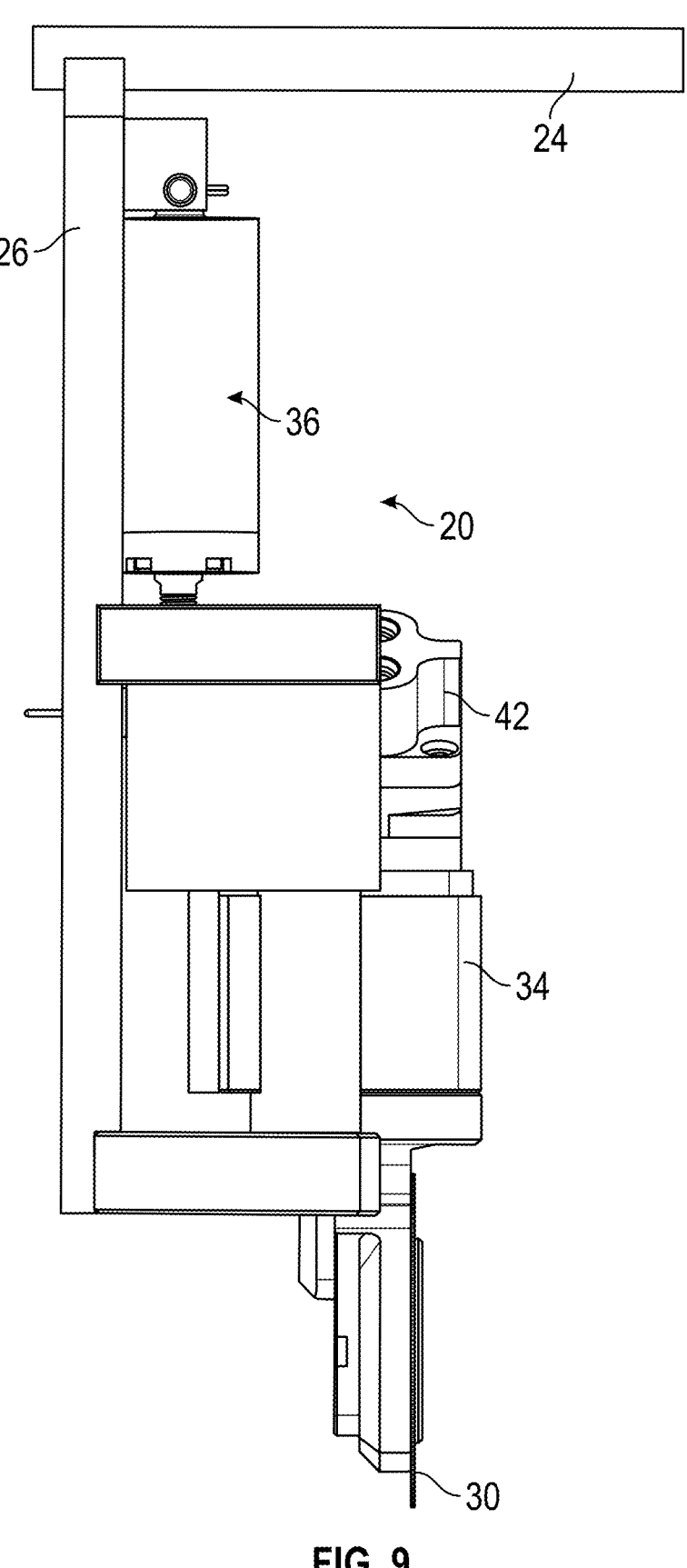
FIG. 9 is a left side view of the scribe saw assembly shown in FIG. 5.
Figure 10:
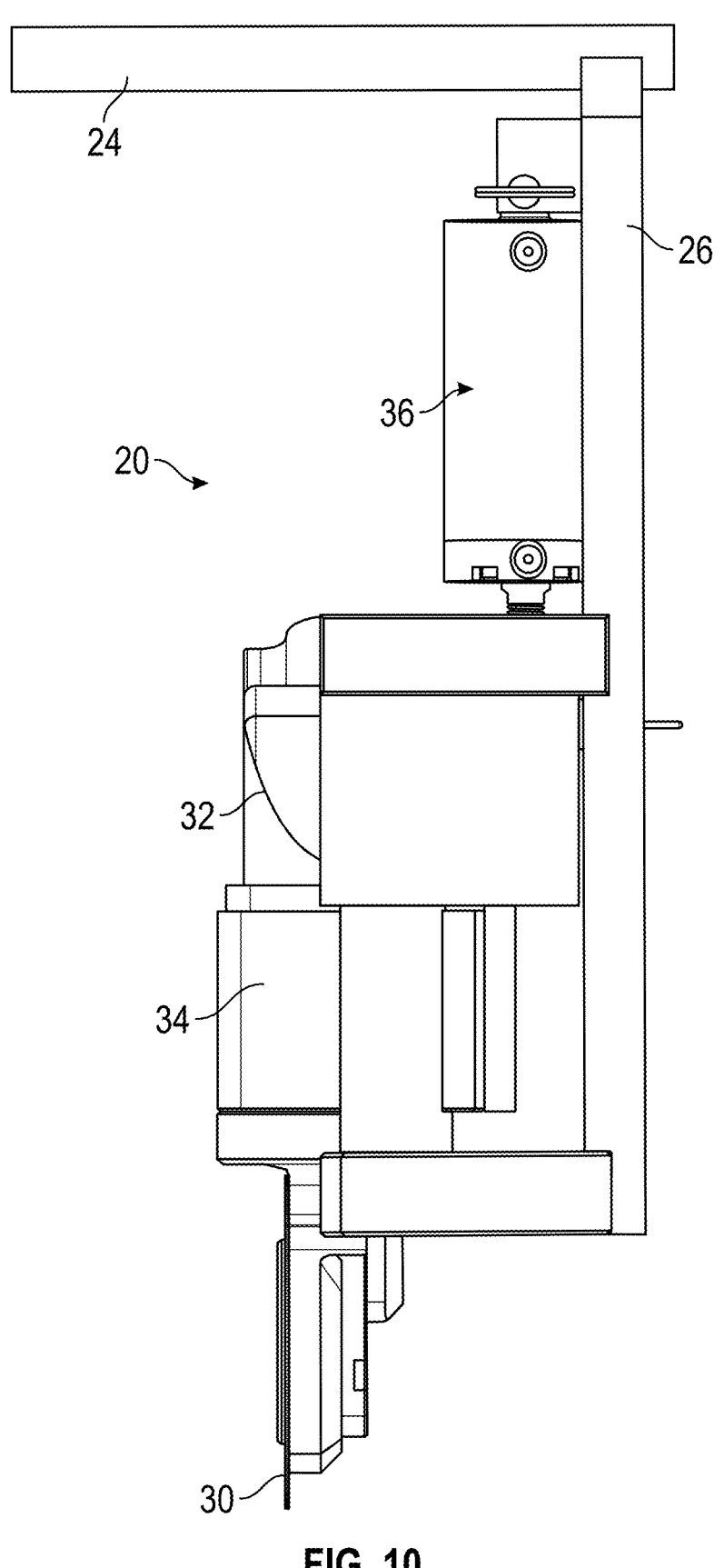
FIG. 10 is a left side view of the scribe saw assembly shown in FIG. 5.
Figure 11:
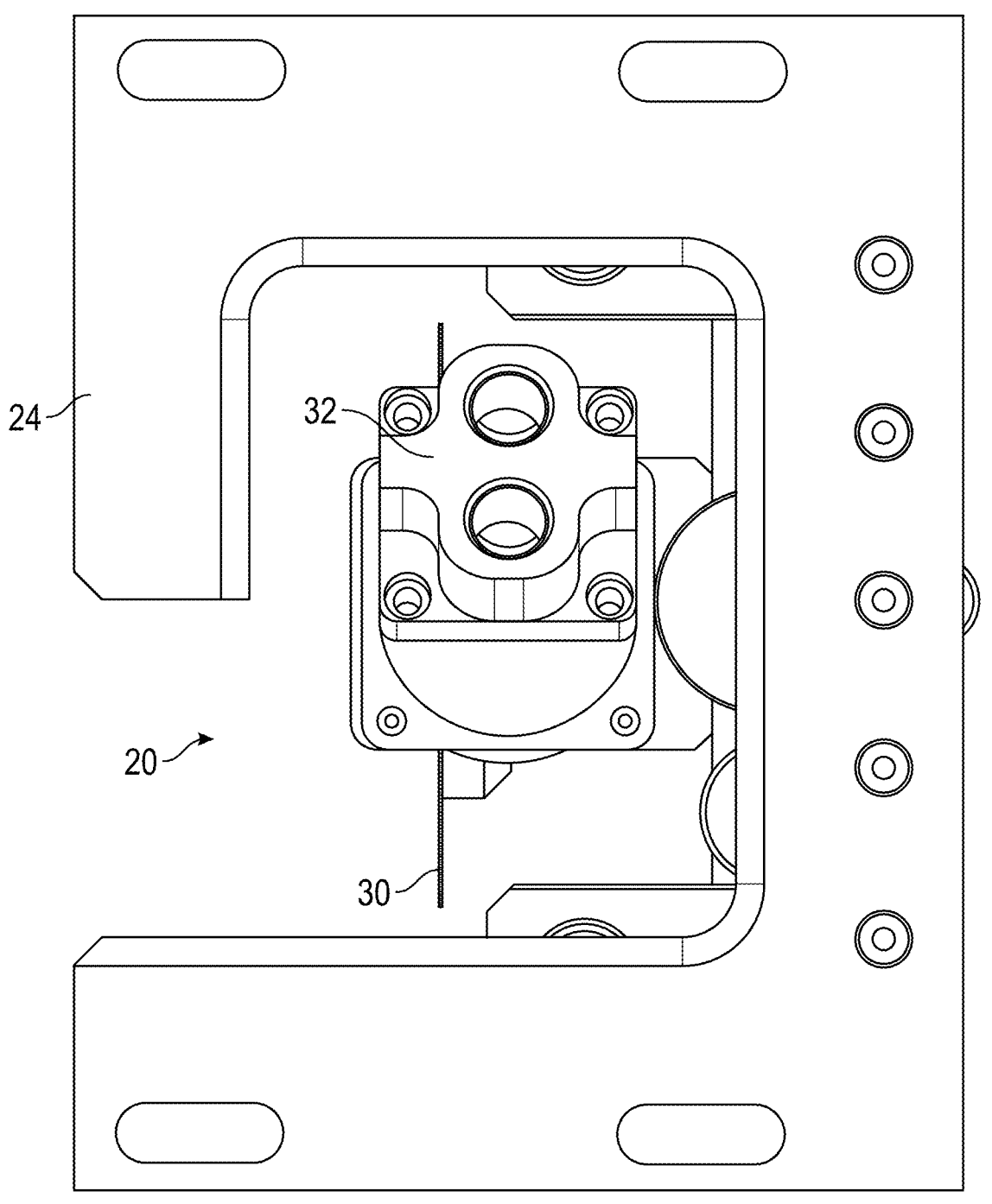
FIG. 11 is a top plan view of the scribe saw assembly shown in FIG. 5.
Figure 12:
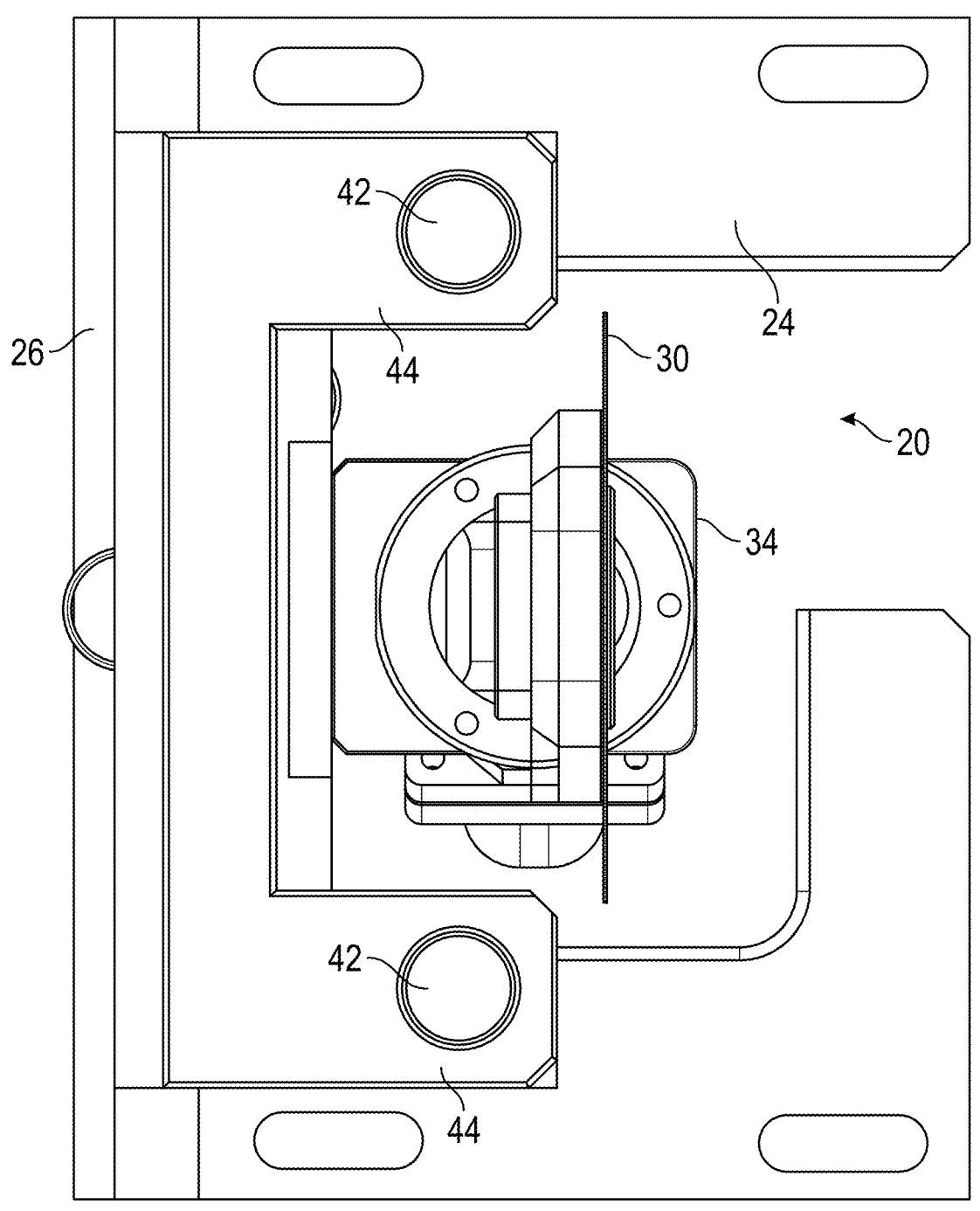
FIG. 12 is a bottom plan view of the scribe saw assembly shown in FIG. 5.
Figure 13:
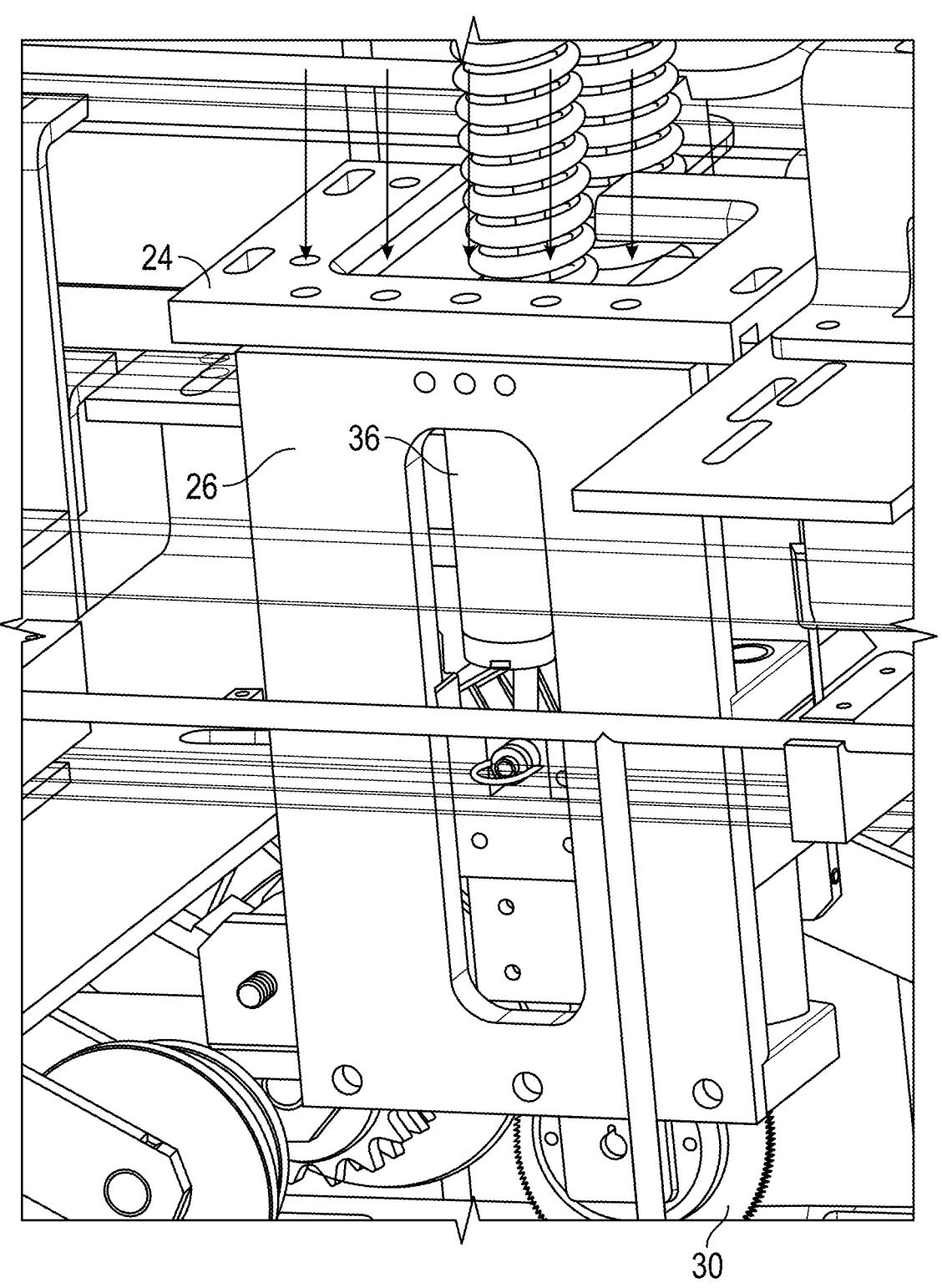
FIG. 13 is an enlarged perspective view showing the mounting connection between the scribe saw assembly and the loin puller machine frame.

The support structure 28 with the blade 30, the motor 32, and the gearbox 34 can be moved between raised and lowered positions by a linear actuator 36, such as a hydraulic cylinder 38 with an extendable and retractable arm 40. The up-and-down movement of the support structure 28 is guided by posts or tracks 42 extending vertically on opposite sides of the actuator 36, as best seen in FIG. 6. The support structure 28 includes a collar or track follower 44 which slides upwardly and downwardly along the posts or tracks 42 when the cylinder arm 40 is retracted or extended. It is understood that the actuator 36 may take other configurations, other than the cylinder 38 and arm 40 shown in the drawings, such as a screw jack. It is further understood that the a single guidepost or track can be utilized, rather than the pair of spaced apart posts 42, though dual posts are preferred such that the applied force of the actuator 36 is balanced. Also, in an alternative embodiment, the posts 42 and collars can be reversed, such that the collars are fixed or stationary on the back mounting plate 26, and the posts move with the support structure 28. In a further embodiment, other configurations of male and female guiding or tracking systems can be utilized to control and maintain accurate vertical movement of the scribe saw blade 30.

Figure 14:
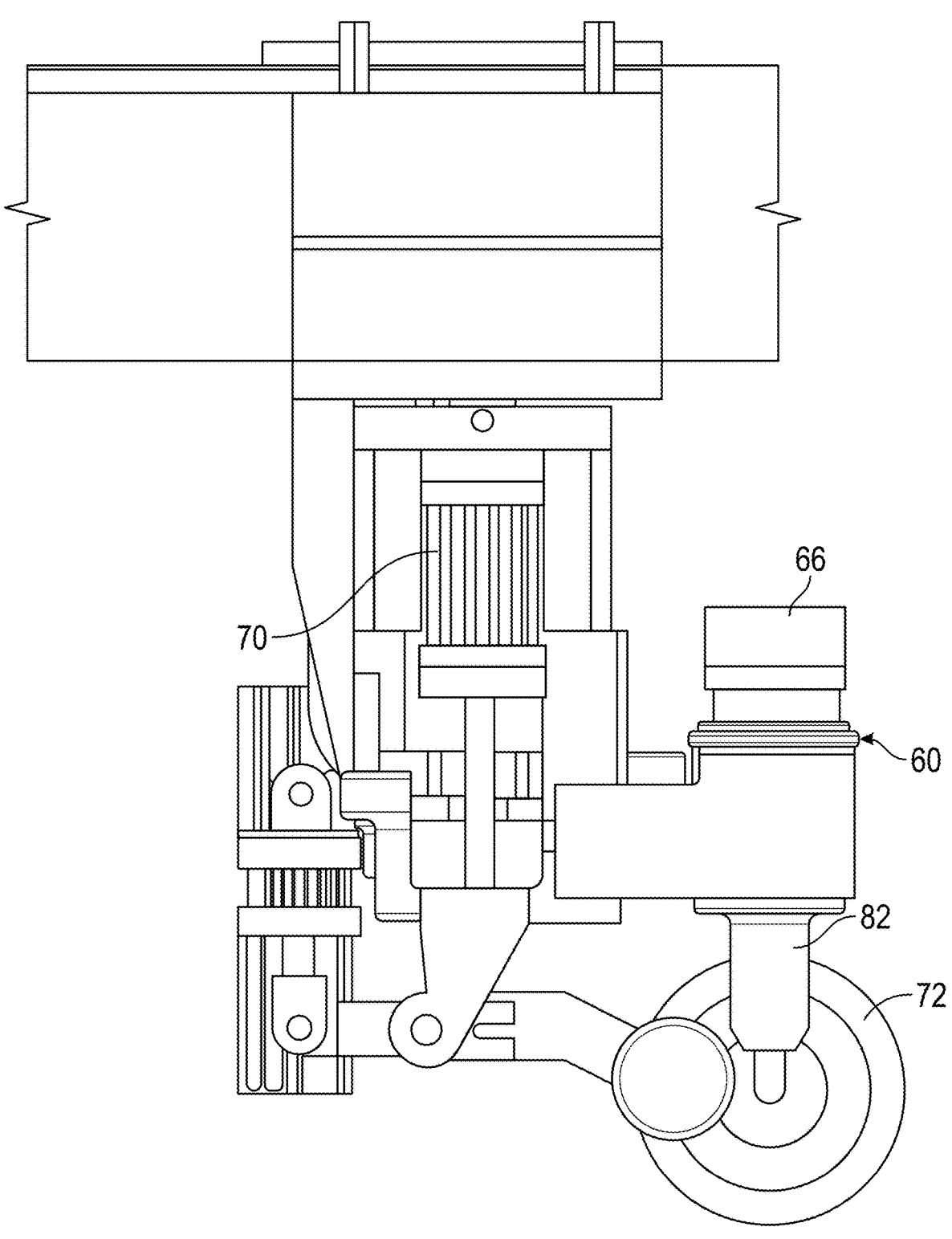
FIG. 14 is a front elevation view showing a prior art configuration of a scribe saw assembly of a loin puller machine.

The blade 30, and the connected movable components, is centrally aligned with the vertical axis of the actuator 36. This longitudinal alignment of the blade 30 with the actuator 36 lines the applied forces with the structural elements, so as to reduce binding and bearing wear, and thereby minimizing maintenance and repair of the scribe saw assembly 20. In comparison, in the prior art scribe saw assembly shown in FIG. 14 and described in U.S. Pat. No. 5,882,252, the scribe saw unit 60, with the motor 66, gearbox 82, and blade 72, is longitudinally offset from the vertical axis of the cylinder 70. This offset configuration of the blade 72 with respect to the extending and retracting forces of the cylinder 70 can create binding problems, and premature bearing wear, thereby increasing maintenance of the scribe saw assembly. Increased maintenance requires the loin puller machine to be shut down, thus losing productivity and profits. In comparison, by aligning the scribe saw assembly components as in the present invention, maintenance is reduced, such that productivity and profitability are increased.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A scribe saw for a loin puller machine having a frame with a conveyor to move loins in a longitudinal direction, the scribe saw comprising:
a mounting bracket attached to the frame;
a saw blade assembly slidably connected to the mounting bracket;
an actuator on the mounting bracket connected to the saw blade assembly to move the saw blade assembly between raised and lowered positions;
the saw blade assembly being longitudinally aligned with the actuator and
the saw blade assembly including a circular blade mounted on a support head, and a motor to rotate the circular blade to cut ribs in the loins.

2. The scribe saw of claim 1 the mounting bracket includes guides to control movement of the saw blade assembly between the raised and lowered positions.

3. The scribe saw of claim 2 wherein the guides includes a pair of spaced apart, vertically extending tracks, and the saw blade assembly slides along the tracks.

4. The scribe saw of claim 3 wherein the saw blade assembly includes spaced apart track followers mounted on the tracks.

5. The scribe saw of claim 1 wherein the saw blade assembly is laterally offset from the actuator.

6. A loin puller machine, comprising:
a frame;
a conveyor on the frame having an inlet end and an outlet end;
a scribe saw assembly mounted to the frame above the conveyor;
the scribe saw assembly including a rotatable blade to cut ribs of a loin moving along the conveyor;
an actuator with an extendable and retractable arm to move the blade up and down;
the blade being centered relative to the actuator arm; and
the inlet and outlet ends defining a longitudinal axis for the conveyor, and the scribe saw actuator and blade being longitudinally aligned with one another.

7. The loin puller machine of claim 6 wherein the scribe saw assembly further includes a guide track to guide the up and down movement of the blade.

8. The loin puller of claim 7 wherein the guide track includes at least one vertical post along which the saw blade slides.

9. The loin puller of claim 8 wherein the scribe saw assembly further includes a collar slidable mounted on the post, and the saw blade is connected to the collar.

10. A loin puller machine, comprising:
a conveyor to carry loins, and having opposite longitudinal ends and opposite lateral sides;
a scribe saw to cut ribs of the loins;
an actuator cylinder laterally adjacent the scribe saw to raise and lower the scribe saw; and
a motor on top of the scribe saw to rotate the scribe saw.

11. The loin puller machine of claim 10 further comprising guide posts on opposite longitudinal sides of the actuator cylinder, and the scribe saw being slidably mounted to the guide posts.

12. The loin puller machine of claim 10 wherein the scribe saw is mounted independently of other cutting blades of the machine.

13. A loin puller machine, comprising:

a frame;

a conveyor on the frame having an inlet end and an outlet end;

a scribe saw assembly mounted to the frame above the conveyor, the scribe saw assembly including a rotatable blade to cut ribs of a loin moving along the conveyor, an actuator with an extendable and retractable arm to move the blade up and down;

the blade being centered relative to the actuator arm;

the scribe saw assembly including a guide track to guide up and down movement of the blade; and the guide track including at least one vertical post along which the saw blade slides.

* * * * *